(12) United States Patent
Papen et al.

(10) Patent No.: US 6,587,623 B1
(45) Date of Patent: Jul. 1, 2003

(54) METHOD FOR REDUCING STIMULATED BRILLOUIN SCATTERING IN WAVEGUIDE SYSTEMS AND DEVICES

(75) Inventors: George Papen, Urbana, IL (US); Peter Dragic, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/638,239

(22) Filed: Aug. 14, 2000

(51) Int. Cl.$^7$ .............................. G02B 6/16; G02B 6/22
(52) U.S. Cl. ....................................... 385/123; 385/127
(58) Field of Search ............................... 385/123–128; 372/6; 359/153, 161, 173, 179, 188, 337, 341.1

(56) References Cited

U.S. PATENT DOCUMENTS

| | | | | |
|---|---|---|---|---|
| 4,820,018 A | * | 4/1989 | Melman et al. | 385/127 |
| 5,170,457 A | * | 12/1992 | Jen | 385/123 |
| 5,721,800 A | * | 2/1998 | Kato et al. | 385/127 |

FOREIGN PATENT DOCUMENTS

| | | | | |
|---|---|---|---|---|
| WO | WO 99/04298 | * | 1/1999 | 385/127 |

OTHER PUBLICATIONS

A.J. Poustie, "Bandwidth and Mode Intensities of Guided Acoustic–Wave Brillouin Scattering in Optical Fibers", *J. Opt. Soc. Am. B.*, vol. 10, No. 4, Apr. 1993, pp. 691–696.

C.K. Jen, J.E.B. Oliveira, N. Goto, K. Abe, "Role of Guided Acoustic Wave Properties in Single–Mode Optical Fibre Design", *Elec. Lett.*, vol. 24, No. 23, Nov. 10, 1988 pp. 1419–1420.

A. Safaai–Jazi, C.K. Jen, G.W. Farnell, "Analysis of Weakly Guiding Fiber Acoustic Waveguide", *IEEE Transactions on Ultrasonics, Ferroelectrics, and Frequency Control*, vol. UFFC–33, No. 1., Jan. 1986, pp. 59–68.

C.A.S. de Oliveira, C.K. Jen, A. Shang, C. Saravanos, "Stimulated Brillouin Scattering in Cascaded Fibers of Different Brillouin Frequency Shifts", *J. Opt. Soc. Am B.*, vol. 10, No. 6, Jun. 1993, pp. 969–972.

C.K. Jen, "Similarities and Differences Between Fiber Acoustics and Fiber Optics", Proc. of 1985 Ultrasonics Symposium, pp. 1128–1133, (Month unknown)1985.

J. Botineau, E. Picholle, D. Bahloul, "Effective Stimulated Brillouin Gain in Singlemode Optical Fibres", *Elec. Lett.*, vol. 31, No. 23, Nov. 9, 1995, pp. 2032–2034.

A. Hadjifotiou and G. A. Hill, "Suppression of Stimulated Brillouin Backscattering by PSK Modulation for High–Power Optical Transmission", *IEEE Proceedings*, vol. 133, Pt. J. No. 4, Aug. 1986, pp. 256–258.

(List continued on next page.)

*Primary Examiner*—John D. Lee
*Assistant Examiner*—Mike Stahl
(74) *Attorney, Agent, or Firm*—Greer, Burns & Crain, Ltd.

(57) ABSTRACT

The method of the invention controls the acoustic waves to be guided away from the portion of the waveguide which guides the light. Thus, acoustic waves are guided into the cladding. A substantial reduction in the SBS effect is then realized in the core that guides light. The method of the invention is applicable to single clad optical waveguides, such as optical fibers, as well as dual clad optical fibers and other waveguides. A preferred dual clad (a.k.a. dual core) waveguide structure permits realization of a pump laser system having reduced SBS effect in the core used for guiding transmitted light to be pumped (amplified). A second core guides acoustic waves outside the core used for guiding transmitted light, and also guides pump light which amplifies the light transmitted in the core for light transmission. Pumping may also be assisted by cladding the second "pump" core with a cladding that is anti-guiding for light and guiding for acoustic waves.

9 Claims, 8 Drawing Sheets

OTHER PUBLICATIONS

L. Eskildsen, P.B. Hansen, U. Koren, B.I. Miller, M.G. Young and K.F. Dreyer, "Stimulated Brillouin Scattering Suppression with Low Residual AM using a Novel Temperature Wavelength–Dithered DFB Laser Diode", *IEEE 196, Electronics Letters Online No.: 1996090*, May 6, 1996.

Y.K. Chen, Y.L. Liu and C.C. Lee, "Directly Modulated 1.55μm AM–VSB Video EDFA–Repeatered Supertrunking System Over 110km Standard Singlemode Fibre Using Multiplexing Techniques", *IEEE 1997, Electronics Letters Online No.: 19970949*, Jun. 10, 1997.

Y. Takushima and T. Okoshi, "Suppression of simulated Brillouin Scattering Using Optical Isolators", Apr. 23, 1992. Electronics Letters, vol. 28 No. 12, pp. 1155–1157.

M. Ohashi and M. Tateda, "Design of Strain–Free–Fiber with Nonuniform Dopant Concentration for Stimulated Brillouin Scattering Suppression", *Journal of Lightwave Technology*, vol 11, No. 1'2, Dec. 1993, pp. 1941–1945.

K. Shiraki, M. Ohashi and M. Tateda, "Performance of Strain–Free Stimulated Brillouin Scattering Suppression Fiber", *Journal of Lightwave Technology*, vol. 14, No. 4, Apr. 1996, pp. 549–554.

K. Shiraki, M. Ohashi and M. Tateda, "Suppression of Stimulated Brillouin Scattering in a Fibre by Changing the Core Radius", *IEEE 1995, Electronics Letters Online No.: 19950418*, Jan. 27, 1995.

R. Stolen, "Polarization Effects in Fiber Raman and Brillouin Lasers", *IEEE Journal of Quantum Electronics*, vol. QE–15, No. 10, Oct. 1979, pp. 1157–1160.

R.H. Stolen, V. Ramaswamy, P. Kaiser and W. Pleibel, "Linear Polarization in Birefringent Single–Mode Fibers", *Appl. Phys. Lett. 33*(8), Oct. 15, 1978, pp. 699–701.

N. Yoshizawa, T. Horiguchi and T. Kurashima, "Proposed for Stimulated Brillouin Scattering Suppression by Fibre Cabling", *Electronics Letters*, vol. 27, No. 12, Jun. 6, 1991, pp. 1100–1101.

M. Akoi, M. Suzuki, M. Takahashi, H. Sano, T. Ido, T. Kawano and A. Takai, High–Speed (10/Gbit/s) and Low–Drive–voltage (1V Peak to Peak) InGaAs/InGaAsP MQW Electroabsorption–Modulator Integrated DFB Laser with Semi–Insulating Buried Heterostructure, Apr. 27, 1992. Electronics Letters, vol. 28 No. 12, pp. 1157–1158.

* cited by examiner

METHOD FOR REDUCING STIMULATED BRILLOUIN SCATTERING IN WAVEGUIDE SYSTEMS AND DEVICES

FIELD OF THE INVENTION

The present invention concerns waveguide systems and devices.

BACKGROUND OF THE INVENTION

Waveguides direct the propagation of light in a controlled fashion. A waveguide is therefore a fundamental component of systems and devices which depend upon the controlled use of light. The scale of waveguides in many modem devices is exemplified by hair sized optical fibers used in communication systems. In communications systems, such as telephone systems, the trend is toward use of optical signals and away from use of electrical signals. Practical reasons exist for the shift in focus to optically driven systems. Unlike electrical signals, optical signals are generally unaffected by electromagnetic fields created by such things as power lines and lightning. These sources of interference may create noise in electrical signals, but optical signals are unaffected.

Information capacity of optical signals is also potentially much larger than lower frequency electrical signals that are used in wired electrical and wireless electromagnetic communication systems. Generally, higher frequency signal carriers provide larger information capacity than lower frequency signal carriers. This is due to the wider bandwidth of the higher frequency signals. Another important benefit of communicating with optical signals is the aforementioned small size of optical fibers used as a transmission medium. A typical fiber having hair sized dimensions is a suitable replacement for bundles of copper wires having a much larger diameter. As demands for information access become larger and larger in modern times, the use of optical transmission systems places less demand on space in the construction of underground, above ground, and internal building communication systems.

Another important use of optical energy communicated through a waveguide is in cutting, weapons, and other high power laser technology. Laser light direct through a waveguide forms useful lasers for cutting everything from machine parts to patients undergoing delicate surgeries. Weapons technologies have focused on laser light as potential bases for systems that track and destroy projectiles, such as missiles, with the destruction being based upon energy from laser light.

Common difficulties are encountered in the practical implementation of such optical energy systems, however. Waveguides, e.g., fibers, introduce losses. Losses limit the distance by which the transmitter and receiver may be separated. These losses are generally referred to as optical signal attenuation. Absorption of signal light by the fiber acting as the transmission medium is one factor causing attenuation. Other factors leading to attenuation are the scattering of the signal light over a wider wavelength than the original transmission and radiative losses, typically occurring at bends in the optical fiber. Combination of these individual losses leads to a total signal attenuation characteristic for a particular optical transmission medium which is measured in decibels per kilometer.

An effect called Stimulated Brillouin Scattering (SBS) has been identified as a primary cause of scattering losses that limits the effectiveness of waveguides. SBS is an interaction of optical energy with acoustic energy. Optical energy guided into optical waveguides, e.g., the core of an optical fiber, produces acoustic energy. As is known in the art, once a certain amount of optical power is directed into a waveguide from another optical source or generated in the waveguide, the effect of SBS causes optical energy to backscatter into the source. Typical waveguides, e.g., optical fiber cable, are long enough (tens of meters) for the SBS interaction to be efficient at low signal power, and SBS is known to affect signals with spectral widths smaller than that of the SBS process. This backscattering is undesirable in most, if not all, applications.

Overcoming or reducing the SBS effect would therefore significantly impact many optical waveguide systems and devices. The ability to launch more power into an optical communication fiber, for example, has the alternative advantages of reducing the number of repeaters or, if the distance between repeaters is kept, of providing higher information capacity. In the field of work performing high power lasers, such as cutting lasers and weapons, overcoming the SBS effect offers the potential to use small semiconductor lasers. Though the semiconductor lasers have advantages in the area of power consumption and compactness, they have not yet found large application as work performing lasers due to the overall limited power developed by the lasers. Improving waveguide efficiencies would allow better use of the limited power developed and allow combination of separate powers from multiple lasers.

Currently, the highest brightness continuous-wave laser sources are fiber lasers and fiber-amplified laser sources. To realize, for example, a laser weapon, a high power laser for cutting applications, a high power free-space communications laser, a high power laser for tracking systems, or an earth-to-satellite power delivery system, multiple fibers can be combined to achieve required powers. However, the signal in each fiber must be coherent (narrow spectral width) enough to allow for beam steering and field shaping of the output of the fiber bundle over extended beam propagation distances. The result is that high-power fiber technology is limited by SBS to inadequate powers. Therefore, overcoming the SBS problem in optical fibers will open the doorway to a new generation of lasers and important applications.

Thus, there is a need for an improved method of limiting the SBS effect in waveguides. It is an object of the invention to provide such an improved method.

SUMMARY OF THE INVENTION

Those and other needs and objects of the invention are met or exceeded by the present method for reducing SBS in waveguides. The method of the invention controls the acoustic waves produced to be guided away from the portion of the waveguide which guides the light. The method of the invention results in novel systems and devices in which SBS effects are reduced and system efficiencies are increased.

In a preferred single clad optical fiber of the invention, cladding around the waveguide core of the fiber is set to guide the acoustic waves generated by the light which is guided in the core. Thus, acoustic waves are guided into the cladding. A substantial reduction in the SBS effect is then realized in the core that guides light.

The method of the invention is applicable to single clad optical waveguides, such as optical fibers, as well as dual clad optical fibers and other waveguides. A preferred dual clad (a.k.a. dual core) waveguide structure permits realization of a pump laser system having reduced SBS effect in the core used for guiding transmitted light and allows the light in the core to be pumped (amplified). A second core guides acoustic waves outside the core used for guiding transmitted light, and also guides pump light which amplifies the light transmitted in the core for light transmission. Pumping may also be assisted by cladding the second "pump" core with a cladding that is anti-guiding for light and guiding for acoustic waves.

BRIEF DESCRIPTION OF THE DRAWINGS

Other objects, features and advantages of the invention will be apparent from the detailed description and the drawings, of which:

FIG. 3a illustrates the shear velocity profile for an optical fiber produced by the method of the invention which corresponds to the type of fiber having the shear velocity profile in FIG. 2a;

DETAILED DESCRIPTION OF THE PREFERRED EMBODIMENTS

The present invention is generally a method for reducing SBS effect in an optical waveguide. The primary principle of the invention is that acoustic energy produced in a core by the light signal guided by it is guided into material around the core. Thus, for example, in a single clad optical fiber, the method sets the cladding around the core to guide acoustic waves. The cladding guides acoustic waves outside the core and the SBS effect is reduced in the core. The method of the invention is applicable to various waveguide structures having a core, i.e., a section for light guiding, and cladding, i.e., a section for light containment within the core, and systems and devices using such waveguides. The discussion herein is primarily directed to preferred single and dual clad optical fibers, but artisans will appreciate the broader applicability of the invention to other devices and systems using waveguides.

The basic acoustic guiding properties of a waveguide are determined by the acoustic V-number of the waveguide. The acoustic "V" number is given by:

$$V = \frac{\omega a}{v_{s1}} \left(1 - \frac{v_{s1}^2}{v_{s2}^2}\right)^{1/2}$$

where the v's are shear velocities and a is the radius. The wave is guided if $v_{waveguide} < v_{clad}$. The same principles apply to a cladding surrounding a waveguide. If material surrounding the cladding has a shear velocity greater than the cladding, then acoustic waves are guided by the cladding. In the case of an optical fiber, the buffer material coated onto the cladding to improve the fiber's mechanical properties is usually much softer (and thus less dense) than glass, and thus the cladding does not guide acoustic waves in current fibers.

Figure 1A:
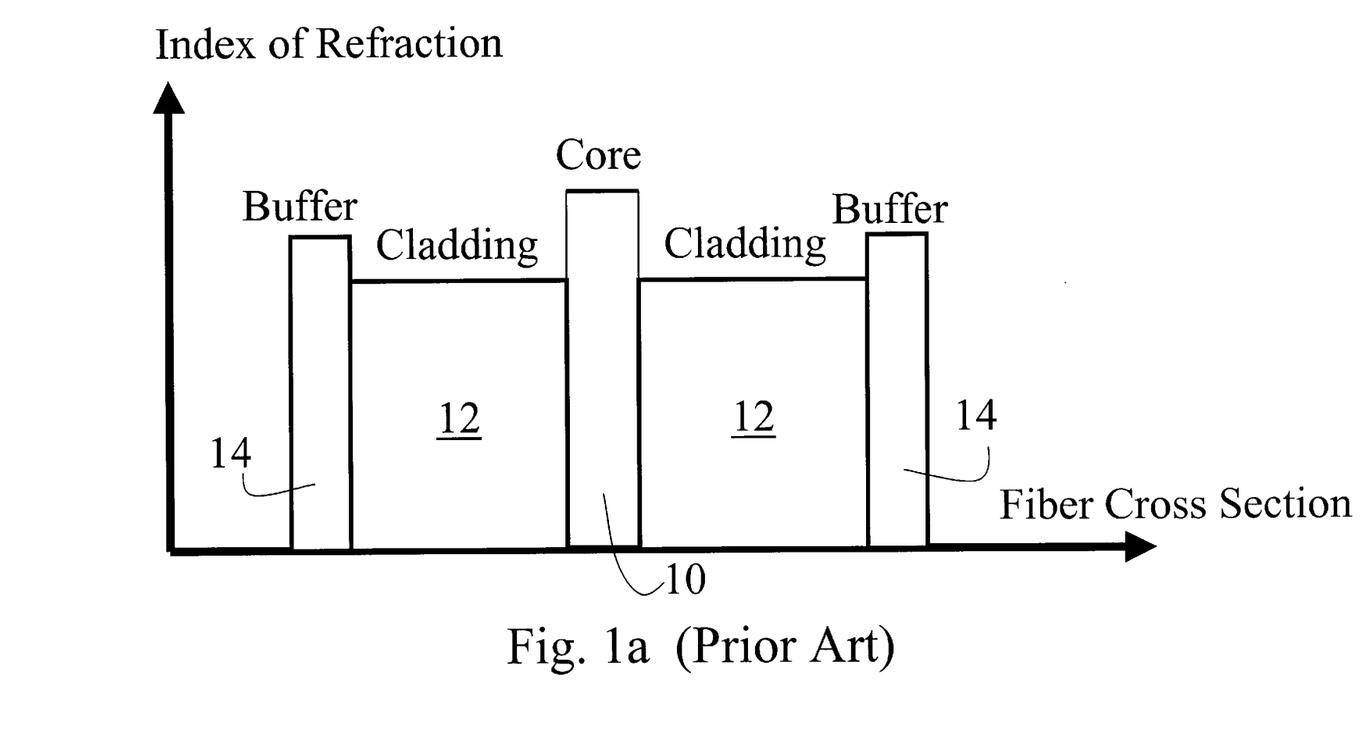
FIG. 1a is the optical index profile for a conventional single clad optical fiber.
Figure 1B:
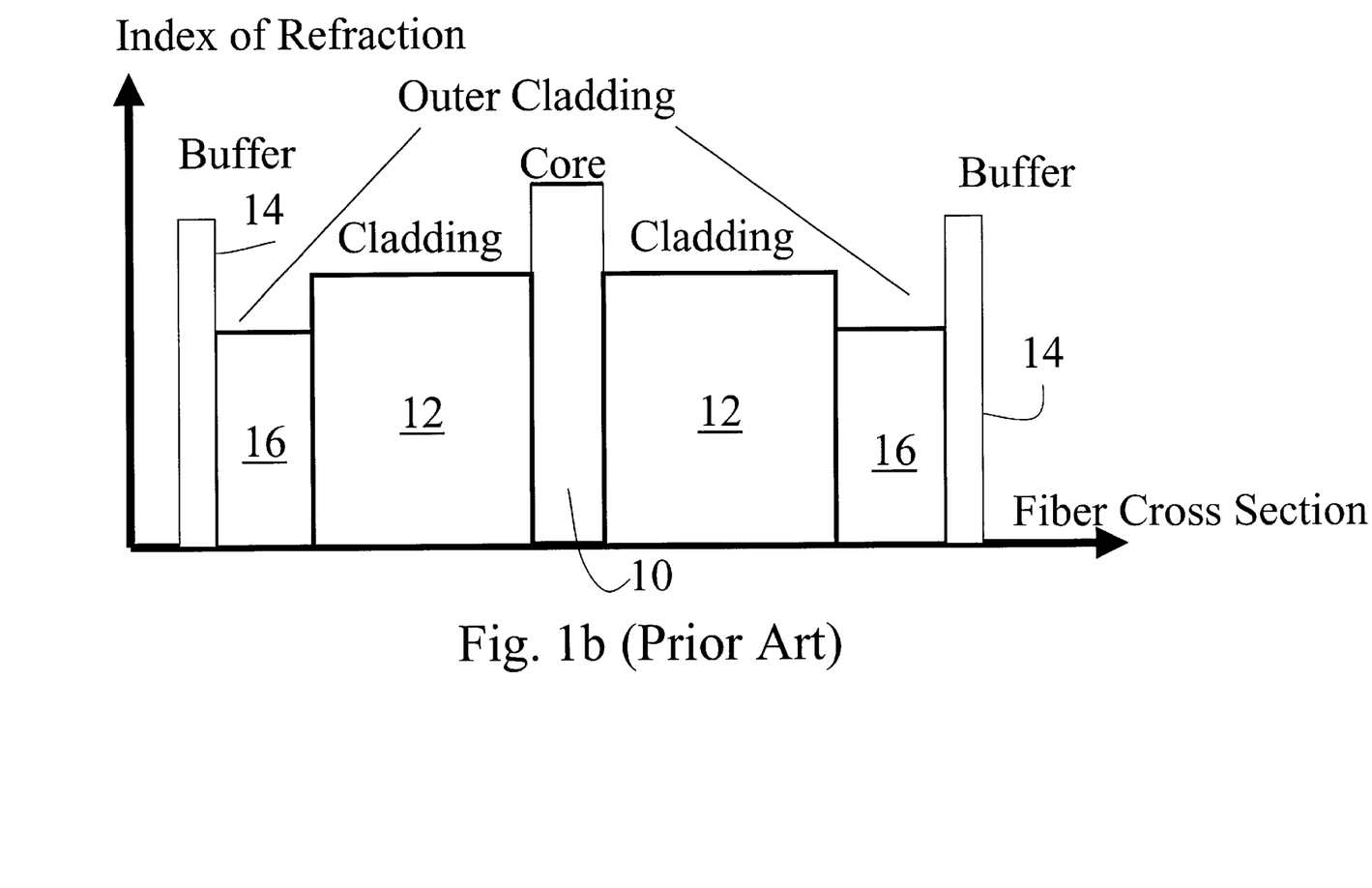
FIG. 1b is the optical index profile for a conventional double clad optical fiber.

Such a fiber is represented by its optical index profile in FIG. 1a. The FIG. 1a fiber is a single mode fiber that is used extensively in the telecommunications industry. The refraction index for a core 10 exceeds that of a cladding 12 and a buffer 14, while the index of refraction for the buffer 14 exceeds that of the cladding 12. A typical dual clad optical fiber is represented in FIG. 1b, and includes an additional outer cladding 16 having an index of refraction less than the cladding 12 (the cladding 12 is also referred to as a second core). The invention is applicable to these and other waveguide structures. The FIG. 1b type of fiber can also be modified by the invention to provide optical guiding, but reduce SBS by controlling the distribution of the acoustic power.

Most telecommunication fiber uses Ge-doped core and a pure silica cladding. For these materials, $n_{core} > n_{clad}$, $v_{core} < v_{clad}$ and thus the fiber core guides both the optical wave and the acoustic wave. Neither the optical nor the acoustic wave is guided by the cladding because $n_{clad} < n_{buffer}$ and $v_{clad} > v_{buffer}$.

Figure 2A:
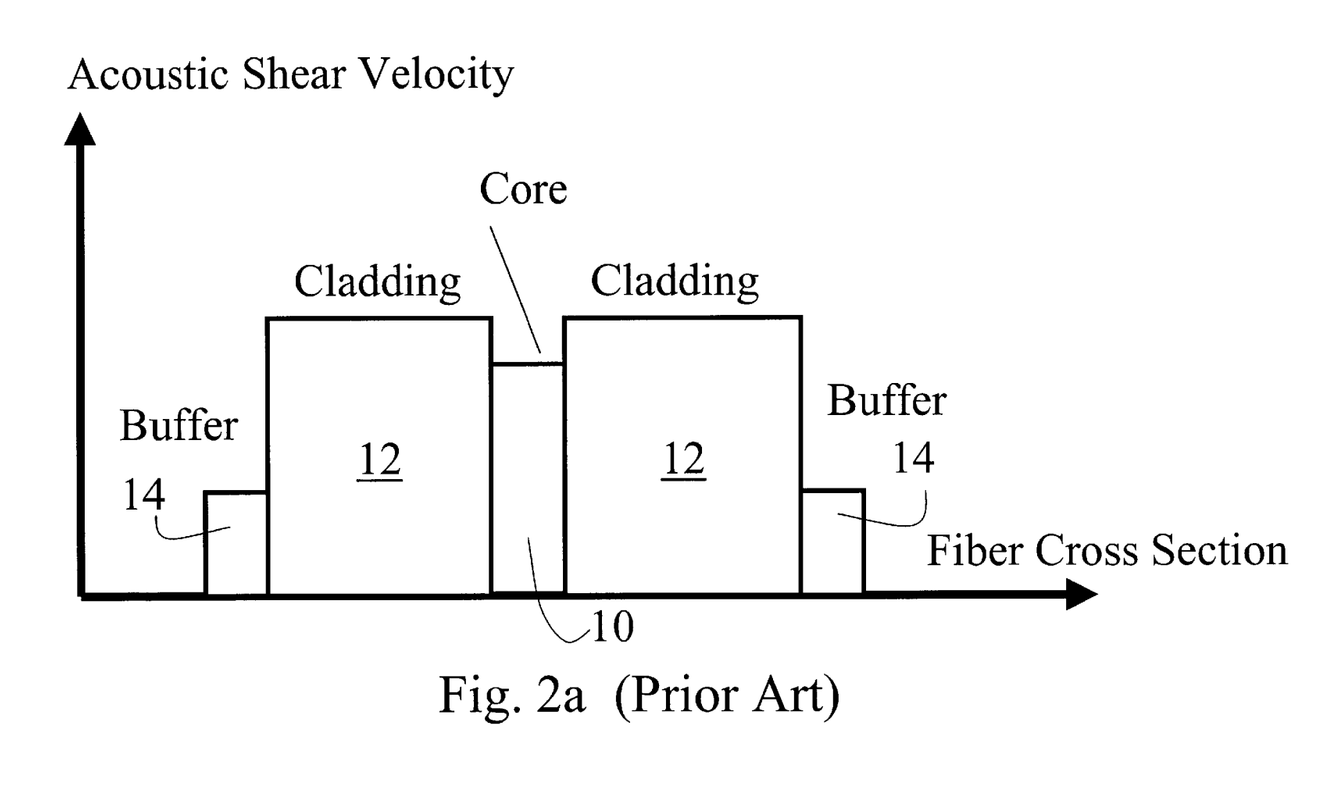
FIG. 2a is the shear velocity profile for acoustic modes in a frequently used conventional Ge doped core silica single clad optical fiber.

The core guides the acoustic modes with the lowest order mode being dominant because of the overlap of this field with single mode optical field. In particular, the cladding does not guide acoustic modes. Other acoustic modes are excited within the fiber, but most are evanescent. Resonant enhancement of SBS process occurs due to coupling of acoustic energy into the guided sound waves in the core. Shear velocity profiles for conventional fibers are shown in FIGS. 2a (single mode), 2b (single mode), and 2c (dual clad). The method of the invention sets the cladding properties to guide acoustic modes, and results in the new shear velocity profiles respectively shown in FIGS. 3a (single mode), 3b (single mode) and 3c (dual clad). An additional outer cladding layer 20 is used to help create the modified shear velocity profiles. The outer cladding layer 20 may be a separate layer from the cladding 12, or it may be realized by doping an outer portion of the cladding 12.

This guiding of acoustic modes by the cladding reduces the SBS in two ways. Coupling acoustic energy out of the core into the cladding modes faster than the SBS interaction time results in a significant amount of acoustic power being carried in the cladding and less in the core, thereby increasing the SBS threshold. A second independent effect is that the total number of acoustic modes increases. The total acoustic power is then distributed over more modes. These modes interfere producing an acoustic speckle pattern within the fiber. The spatial variation or contrast of this speckle pattern is what causes the light to backscatter. Making the cladding guide the acoustic energy implies that more acoustic modes propagate. The speckle pattern from the increased number of modes has less variation than without the clad guiding. This reduced contrast reduces the ability of the total acoustic field to backscatter the light and thus increases the SBS threshold.

The reduction of SBS by generating an acoustic speckle pattern comprised of many modes is supported by two experimental facts. The first is that the SBS threshold in a fiber is higher than bulk. This is somewhat counter intuitive, since the total acoustic power that overlaps the optical field in a fiber should be larger than in bulk due to the guiding properties of the fiber and there should be a resonant enhancement of the SBS in the fiber. However, if this additional acoustic power is distributed among many modes such that the total contrast of the speckle pattern is reduced, the net result is a higher SBS threshold. This higher threshold is seen experimentally. The second fact is that the SBS threshold appears to increase in double clad fibers relative to single clad fibers. Again, this increase can be explained by the fact that the double clad structure can support more acoustic modes than the single clad structure.

The method of the invention sets material properties to determine the acoustic and optic guiding and anti-guiding nature of core and cladding. To realize an acoustically guiding cladding, the condition $v_{clad} < v_{outside\ clad}$ must be met. Dopants which increase the shear velocity while also increasing the index of refraction required to maintain the optical index profile may be used to form cladding that is acoustic guiding and light anti-guiding in accordance with the invention. Aluminum is one exemplary dopant for a fiber of the conventional types shown in FIG. 1a and 1b. It can be incorporated into the outer part of the cladding to increase the shear velocity, resulting in the shear velocity profile produced by the invention and shown in FIG. 3a. This increase of the index on the outer edge of the fiber cladding is a simple additional diffusion step that can be done during the manufacturing stage of the fiber pre-form. Alternately, the increase of the index might be the result of an additional Aluminum doped layer.

Figure 2B:
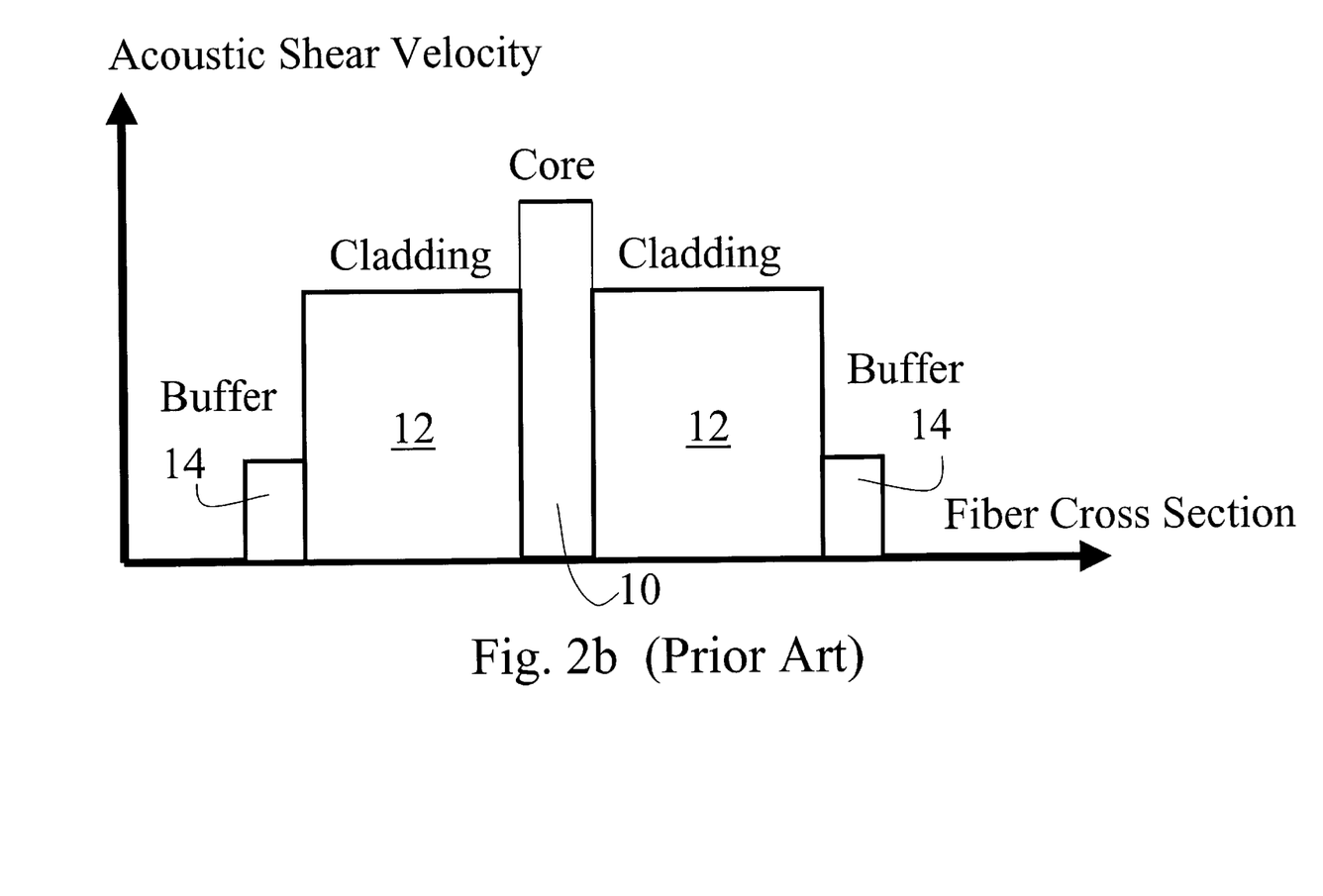
FIG. 2b is the shear velocity profile for acoustic modes in a less common optical fiber.
Figure 3A:
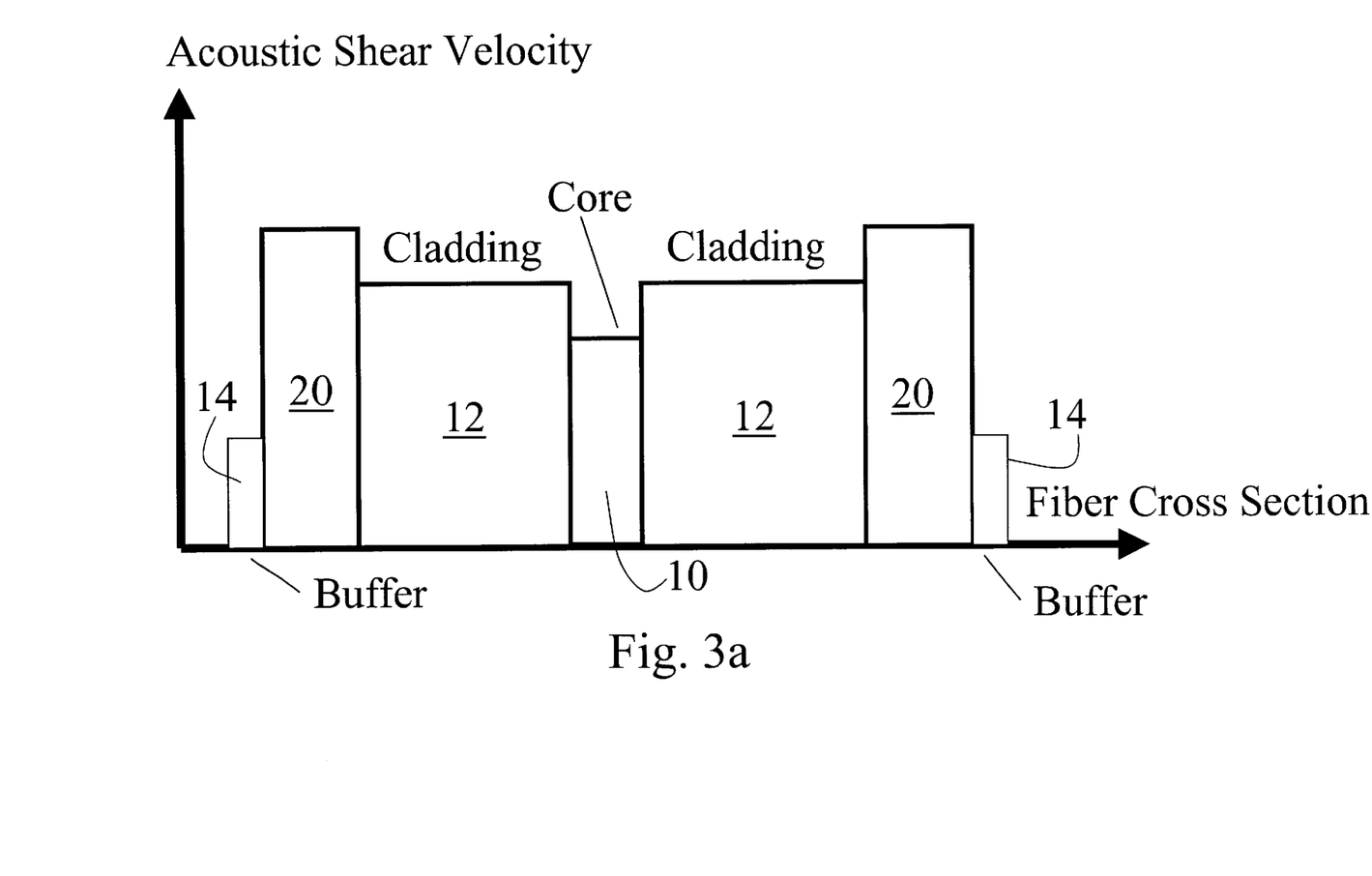

Fibers of the conventional type exhibiting the shear velocity profile in FIG. 2b have a different structure in which the core does not guide acoustic waves. In typical realization of the conventional FIG. 2b fiber, the core is pure silica, but the cladding is Fluorine doped. The optical properties are the same $n_{core} > n_{clad}$, but the acoustic guiding properties of the core are reversed $v_{core} > v_{clad}$ compared to the conventional fiber structure shown in FIG. 1a. The cladding does not guide acoustic energy because $v_{clad} > v_{buffer}$.

Figure 3B:
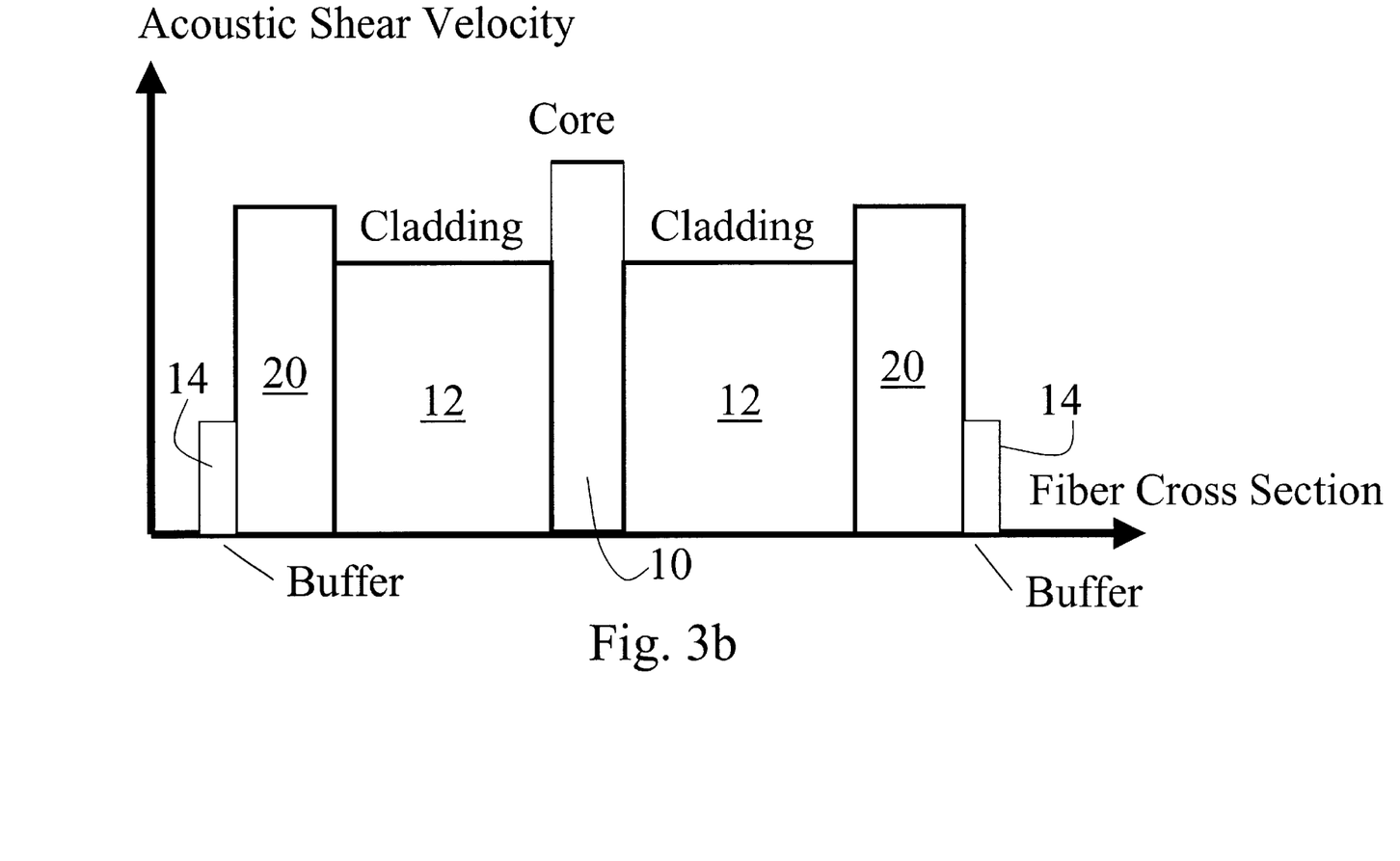
FIG. 3b illustrates the shear velocity profile for an optical fiber produced by the method of the invention which corresponds to the type of fiber having the shear velocity profile in FIG. 2b.

The SBS threshold should be similar to bulk because no guiding occurs. The ability of this structure to reduce SBS relative to the first structure considered depends on the magnitude of the radiated acoustic power within the SBS interaction time. To increase the SBS threshold in accordance with the invention, the waveguide properties must be changed so that the cladding guides acoustic waves, as shown in FIG. 3b. In order for this structure to be more efficient than the FIG. 3a structure, the acoustic power must radiate from the core before the optical field interacts with it. In other words, the guided cladding acoustic modes must be established before the SBS interaction between the acoustic and optical fields takes place. If this occurs, the modified FIG. 3b structure should work better than the FIG. 3a structure because the core in FIG. 3b does not trap acoustic energy.

The FIG. 3b structure may be achieved, for example, by using a pure silica outer cladding with an increased index and increased shear velocity relative to the Fluorine doped cladding. Almost all of the acoustic energy is coupled into cladding modes and the resultant many mode speckle pattern will not produce efficient SBS in the core.

Figure 2C:
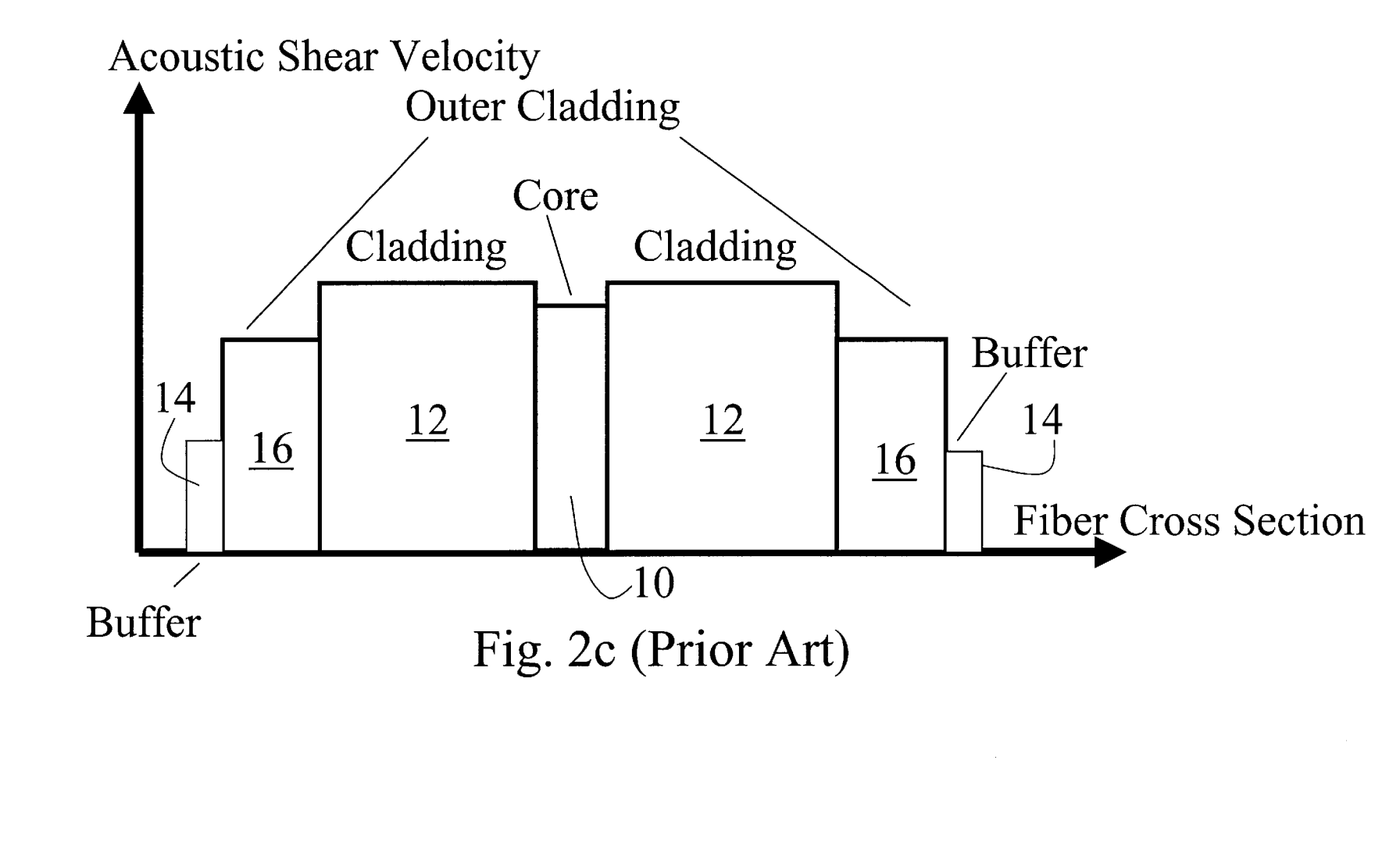
FIG. 2c is the shear velocity profile for a conventional dual clad (a.k.a dual core) fiber.

Double cladding fiber has an additional optical guiding structure that is used in high power fiber sources to guide the pump light. Double clad fibers are also called double core fibers. A conventional velocity profile for a double clad fiber is shown in FIG. 2c, and the corresponding ideal shear velocity profile for a double clad fiber modified by the method of the invention is shown in FIG. 3c.

Figure 3C:
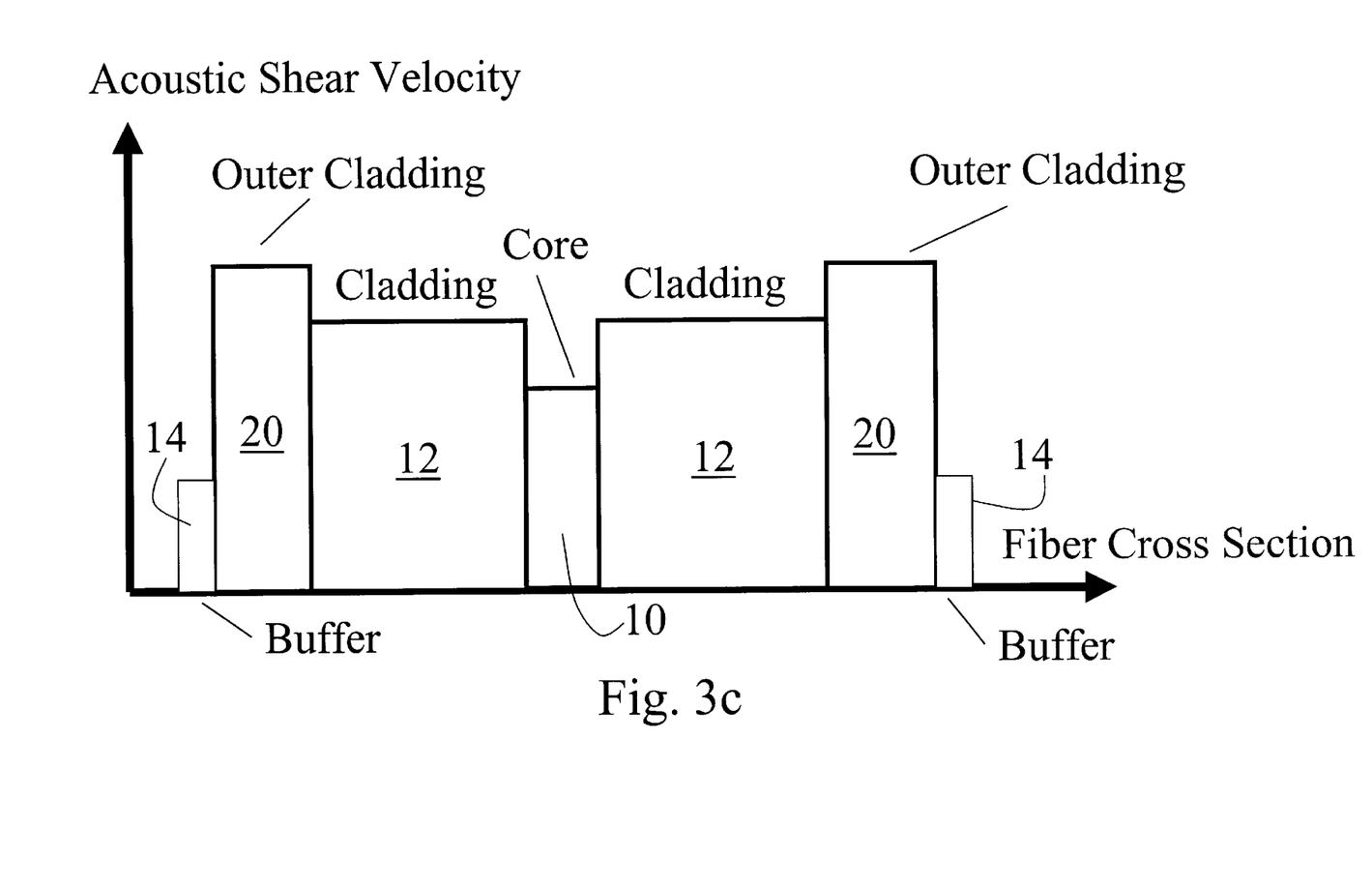
FIG. 3c illustrates an optical fiber produced by the method of the invention corresponding to the profile in FIG. 2c.

The FIG. 3c modification utilizes an outer cladding material with a shear velocity greater (and an optical index lower) than the inner cladding (also called a second core). Resonant acoustic modes excited in cladding will draw acoustic energy out of the core acoustic mode. The resulting speckle pattern will not be as efficient in backscattering the light. We again note that there is evidence that this effect occurs in double fiber. This is consistent with our explanation that the additional cladding structure allows for more acoustic modes to propagate relative to single clad fiber reducing the contrast of the total speckle pattern of the acoustic field and thus increasing the SBS threshold. The proposed mechanism that is the basis for the present invention may explain this effect and allow us to control and enhance this reduction mechanism resulting in significantly (~10x) higher power fiber sources.

This leads to the FIG. 3c dual clad (dual core) structure. The surrounding cladding 12 is acoustic guiding and anti-light guiding for light modes of the core 10 but guiding for pump light modes that can be used for optical amplification of the core light modes. The outer cladding 20 is acoustic mode guiding and anti-light guiding. In this arrangement with the method of the invention applied, SBS will be reduced in the core 10. A lesser reduction is realized in the cladding 12 (second core), however, the band of pump light need not be narrow and the cladding/second core 12 therefore provides an excellent structure for amplifying the signal in the core 10. A practical application to a fiber, for example, might therefore use the core 10 for light signal transmission, and the cladding/second core 12 for pumping light.

There are two basic unknowns in the present method that may limit its utility:

1. The quantitative relationship of overlap between sound wave and optical field and the magnitude of the SBS.
2. What is the magnitude of the time constant for the coupling of acoustic energy into guided acoustic ($\sim a/v_{s2}$) modes relative to that of the SBS interaction time constant?

These issues will affect the magnitude of the reduction, but should not affect the basic application of the SBS reduction of the invention. Optimizations may be made in recognition of these principles without departing from the scope of the invention.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for reducing stimulated brillouin scattering in an optical waveguide having a cladding and a core, the method comprising steps of:

setting core properties to guide optical waves;

setting cladding properties relative to core properties to contain optical waves to be guided in the core;

setting the cladding properties to guide and substantially confine acoustic waves.

2. The method according to claim 1, wherein said steps of setting cladding properties comprise controlling the material properties of the cladding.

3. The method according to claim 2, wherein the material properties of the cladding are controlled by doping.

4. The method according to claim 1, wherein said steps of setting cladding properties comprise adding an acoustic guiding layer to a non-acoustic guiding layer.

5. A method for reducing stimulated brillouin scattering in an optical waveguide having a cladding and a core structure in which the core has an acoustic shear velocity less than that of a surrounding cladding, the method comprising creating a shear velocity profile in which:
- an inner portion of the cladding adjacent the core has an acoustic shear velocity exceeding an acoustic shear velocity of the core;
- an outer portion of the cladding has an acoustic shear velocity exceeding that of the inner portion of the cladding; and
- wherein properties of the inner portion and the outer portion of the cladding are set to optimize acoustic wave guidance.

6. A method for reducing stimulated brillouin scattering in an optical waveguide having a dual cladding and core structure in which the core has an acoustic shear velocity less than that of a surrounding inner cladding, the method comprising creating a shear velocity profile in which:
- the inner cladding surrounding the core has an acoustic shear velocity exceeding an acoustic shear velocity of the core;
- an outer cladding surrounding the inner cladding has an acoustic shear velocity exceeding that of the inner cladding; and
- wherein properties of the inner cladding and the outer cladding are set to optimize acoustic wave guidance.

7. A method for reducing stimulated brillouin scattering in an optical waveguide having a cladding and a core structure in which the core has an acoustic shear velocity greater than that of a surrounding cladding, the method comprising creating a shear velocity profile in which:
- an inner portion of the cladding adjacent the core has an acoustic shear velocity less than an acoustic shear velocity of the core to guide and substantially confine acoustic waves;
- an outer portion of the cladding has an acoustic shear velocity exceeding that of the inner portion of the cladding.

8. A method for manufacturing an optical waveguide having reduced stimulated brillouin scattering, said method comprising:
- providing a core;
- setting material properties of said core to guide optical waves;
- surrounding said core with a cladding structure, said cladding structure including an inner cladding and an outer cladding;
- setting material properties of said cladding structure to capture acoustic waves emitted from said core to substantially confine and guide said acoustic waves back into said core; and
- setting relative material properties of said inner cladding and said outer cladding so that $v_{inner\ clad} < v_{outer\ cladding}$.

9. A method for reducing stimulated brillouin scattering in an optical waveguide having a dual cladding and core structure in which the core has an acoustic shear velocity greater than that of a surrounding inner cladding, the method comprising creating a shear velocity profile in which:
- the inner cladding surrounding the core has an acoustic shear velocity less than acoustic shear velocity of the core to guide and substantially confine acoustic waves;
- an outer cladding surrounding the inner cladding has an acoustic shear velocity greater than that of the inner cladding.

* * * * *